United States Patent [19]

Swars

[11] Patent Number: 5,144,797
[45] Date of Patent: Sep. 8, 1992

[54] EXHAUST GAS PIPE WITH CATALYST CARRIER BODY EXPOSED TO A HELICAL FLOW

[75] Inventor: Helmut Swars, Bergisch Gladbach, Fed. Rep. of Germany

[73] Assignee: Emitec Gesellschaft Fuer Emissionstechnologie mbH, Lohmar, Fed. Rep. of Germany

[21] Appl. No.: 633,300

[22] Filed: Dec. 24, 1990

[51] Int. Cl.$^5$ .......................... F01N 3/02; F01N 3/28
[52] U.S. Cl. .......................... 60/299; 55/466;
   55/523; 55/DIG. 30; 60/297; 60/311; 422/176;
   422/180
[58] Field of Search .......................... 60/299, 311, 297;
   422/180, 176; 55/DIG. 30, 466, 523

[56] References Cited

U.S. PATENT DOCUMENTS

| 2,682,312 | 6/1954 | Hopkins. |
| 4,519,820 | 5/1985 | Oyobe et al. |
| 4,923,109 | 5/1990 | Cyron .......................... 29/890 |

FOREIGN PATENT DOCUMENTS

| 0245736 | 11/1987 | European Pat. Off. |
| 0245737 | 11/1987 | European Pat. Off. |
| 2308721 | 8/1974 | Fed. Rep. of Germany. |
| 3536315 | 4/1987 | Fed. Rep. of Germany ...... 422/180 |
| 8908671 | 3/1990 | Fed. Rep. of Germany. |
| 17415 | 2/1979 | Japan .......................... 60/299 |
| 2040179 | 8/1980 | United Kingdom. |

Primary Examiner—Douglas Hart
Attorney, Agent, or Firm—Herbert L. Lerner; Laurence A. Greenberg

[57] ABSTRACT

An exhaust gas pipe includes a plurality of segments forming at least one angular bend which preferably includes an angle of approximately 90°. The segments include a first segment having a given diameter. An adaptor communicates with the first segment. A second segment communicates with the adaptor and has a diameter larger than the given diameter. A honeycomb body is disposed directly downstream of the adaptor and has a side with an end surface facing towards an exhaust gas flow. The adaptor may have a shape forcing exhaust gas to approach the end surface in a helical and/or spiral path having a curvature and pitch reducing or preventing contact between exhaust gas having already been deflected and exhaust gas newly flowing into the adaptor. The adaptor may have an inside with approximately the shape of a coiled and/or spiral tubing segment approaching the end surface and being cut open in direction toward the end surface.

46 Claims, 2 Drawing Sheets

EXHAUST GAS PIPE WITH CATALYST CARRIER BODY EXPOSED TO A HELICAL FLOW

The invention relates to an exhaust gas pipe or pipeline being bent at an angle of preferably approximately 90°, including a plurality of segments in which a first segment communicates with a second segment of larger diameter through an adaptor, and a honeycomb body disposed immediately downstream of the adaptor has an end surface on a side facing towards the flow.

Such a configuration is known, for instance, from German Published, Non-Prosecuted Application DE-OS 2 308 721. Exhaust gas pipes for internal combustion engines in motor vehicles must often be bent (sometimes several times) in order to bypass other components, or to accommodate the entire exhaust gas system under the motor vehicle, because of the limited space available. Increased pressure losses occur at the bends. Pressure losses are also caused by the almost always necessary disposition of mufflers, in which a reduction of operating noises is attained by multiple deflection and/or reflection of the sound waves.

In order to reduce toxic emissions in internal combustion engines (which in particular are carbon monoxide and nitrogen oxides in Otto engines and mainly soot in Diesel engines), honeycomb bodies made of metal or ceramic are increasingly installed in exhaust gas pipes. Such bodies work by means of a catalytic coating applied to them or they act as a filter. The effectiveness of the catalytic coating is impaired by the fact that the exhaust gas flow in the channels of the honeycomb body, which are necessarily long in proportion to their cross section, soon becomes laminar. Gas particles located in the center of the thread of the stream passing through a channel may accordingly no longer come into contact with the catalytic coating. In order to overcome that problem, it has already been proposed in German Published, Non-Prosecuted Application DE 35 36 315 A1 to provide devices upstream of the catalyst carrier body to assure improved turbulence. Such an effect occurs to some extent in the aforementioned German Published, Non-Prosecuted Application DE-OS 2 308 721 as well.

In order to keep the pressure loss within limits, when a catalyst system is present it is customary to dispense with the otherwise typical preliminary muffler, although in that case there is correspondingly less noise abatement.

As experiments have shown, the disposition of a catalyst carrier body or diesel soot filter in an exhaust pipe segment of enlarged cross section leads to a nonuniform oncoming flow to the honeycomb body over its cross section, even if a frustoconical adaptor acting as a diffuser is present. The peripheral regions of the honeycomb body in particularly are less strongly impinged, and thus become less effective.

It is accordingly an object of the invention to provide an exhaust gas pipe with a catalyst carrier body exposed to a helical flow that is to be constructed with bends, which overcomes the hereinafore-mentioned disadvantages of the heretofore-known devices of this general type and which does so in such a way that the oncoming flow to a catalyst carrier body or Diesel soot filter disposed therein is improved. The accordingly necessary deflection of the gas flow may be simultaneously used for noise abatement, so that the aforementioned absence of a separate preliminary muffler can be completely compensated for. As a result, the total pressure loss in the exhaust gas pipe can be reduced. Another object is better utilization of the catalytic or filter capacity, because the oncoming flow is made uniform over the cross section or even shifted to the outer regions.

With the foregoing and other objects in view there is provided, in accordance with the invention, an exhaust gas pipe, comprising a plurality of segments forming at least one angular bend, preferably including an an angle of approximately 90°, the segments including a first segment having a given diameter, a (first) adaptor communicating with the first segment, a second segment communicating with the (first) adaptor and having a diameter larger than the given diameter, and a honeycomb body being disposed directly downstream of the (first) adaptor and having a side with an end surface facing towards an exhaust gas flow, the (first) adaptor having a shape forcing exhaust gas to approach the end surface in a helical and/or spiral path or course having a curvature and pitch, slope or incline of the coils or spirals reducing or preventing contact between exhaust gas having already been deflected and exhaust gas newly flowing into the (first) adaptor.

With the objects of the invention in view, there is also provided an exhaust gas pipe, comprising a plurality of segments forming at least one angular bend, preferably including an angle of approximately 90°, the segments including a first segment having a given cross section, a (first) adaptor communicating with the first segment, a second segment communicating with the (first) adaptor and having a cross section larger than the given cross section, and a honeycomb body being disposed directly downstream of the (first) adaptor and having a side with an end surface facing towards an exhaust gas flow, the (first) adaptor having an inside with approximately the shape of a coiled or helical and/or spiral tubing segment approaching the end surface and being cut open in direction toward the end surface.

If the inside of the first adaptor has such a shape or contour, then the exhaust gas flowing into the adaptor can be distributed uniformly over the end surface of the honeycomb body. Instead of a single, more or less rectangular deflection of the exhaust gas flow, this flow is oriented obliquely, in a defined helical motion, against the walls that extend axially and separate the individual channels of the body from one another. As a result, increased turbulence of the exhaust gas flow in the channels is attained, thus shifting the onset of laminarization outward in the channels. Sound waves traveling in the exhaust gas flow are also damped by multiple reflection at the walls.

In accordance with another feature of the invention, the first segment has approximately one-half to three-fourths of the diameter of the second segment, and particularly advantageous conditions arise if the diameter of the first segment is about half that of the second segment. In this case, particularly advantageous conditions can be attained, as will also be explained in conjunction with the exemplary embodiment shown in the drawing.

In accordance with a further feature of the invention, the (first) adaptor has approximately the contour of coiled tubings resting tightly on one other, and carries all of the exhaust gas within or in less than approximately one revolution in the coil, completely to the end surface. It should be noted that the contour of the adaptor can assume the shape of a spiral or worm, or a mixture of these shapes, depending on the size ratios between the diameters of the first and second segments. However, in each case, in the course of its curvature the wall carrying the exhaust gas flow increasingly approaches the end surface of the honeycomb body.

In accordance with an added feature of the invention, the shape of the (first) adaptor forces the exhaust gas flow to take a path in which it meets the end surface at an angle of substantially between 30° and 60°. The shapes of the first adaptor that cause the exhaust gas flow to meet the end surface of the honeycomb body at such an angle have proved to be advantageous in experiments.

In accordance with an additional feature of the invention, the first segment discharges approximately at a tangent into the (first) adaptor. This has also proved advantageous because in this way the exhaust gas flows into the adaptor eccentrically and with the least pressure loss.

In accordance with yet another feature of the invention, the adaptor is a first adaptor, and including a third segment, and a second adaptor similar to the first adaptor forming a transition between the second segment and the third segment. If the exhaust gas pipe has a further bend downstream of the second segment, then it is naturally advantageous to form this bend similarly to the first bend, by means of a second adaptor. With such a configuration, a honeycomb body can be installed transversely to the direction of travel of a motor vehicle.

In accordance with yet a further feature of the invention, the honeycomb body is a catalyst carrier body for exhaust gas decontamination.

In accordance with yet an added feature of the invention, the catalyst carrier body is assembled from a plurality of structured layers of sheet metal. Metal honeycomb bodies of this type are described, for instance, in German Petty Patent G 89 08 671, or Published European Application 0 245 736 Al, or Published European Application 0 245 737 Al, corresponding to U.S. Pat. Nos. 4,923,109 and 4,847,962.

In accordance with yet an additional feature of the invention, some of the layers or sheets on the leading end surface of the catalyst carrier body facing into the flow protrude beyond the other sheets. Not only does this increase the noise abatement effect, but it also promotes turbulence in the flow in the channels.

In accordance with again another feature of the invention, the sheets of a metal honeycomb body extend from the interior of the honeycomb body outward in the same manner, for instance in evolute fashion or approximately circularly, and the direction of rotation defined by the first adaptor is in the same direction or in the opposite direction relative to the prevailing curvature of the layers or sheets. If the direction of rotation is the same, the pressure loss of the configuration can be reduced, while an opposite direction of rotation can achieve increased noise abatement.

In accordance with again a further feature of the invention, at least some of the layers or sheets have openings formed therein through which adjacent channels formed between them communicate with one another. This provides an improvement in noise abatement. Since the sound waves propagated in the various channels are phase displaced from one another, it must be expected that at the connecting points represented by the openings, some of the sound waves cancel each other out by superimposition.

In accordance with again an added feature of the invention, the honeycomb body is a Diesel soot filter.

In accordance with again an additional feature of the invention, some of the ribs or webs forming the honeycombs can likewise protrude past the other ribs or webs on the leading end surface facing into the flow. Once again, this achieves more advantageous noise abatement properties. In such a case, the body may be a honeycomb-shaped ceramic body.

In accordance with a concomitant feature of the invention, the first and/or second adaptor has a surface structure on the inside that has a sound-dispersing effect. This can, for instance, be attained by means of knobs or similar built-in features. An additional increase in noise abatement can be attained in this way.

Other features which are considered as characteristic for the invention are set forth in the appended claims.

Although the invention is illustrated and described herein as embodied in an exhaust gas pipe with a catalyst carrier body exposed to a helical flow, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
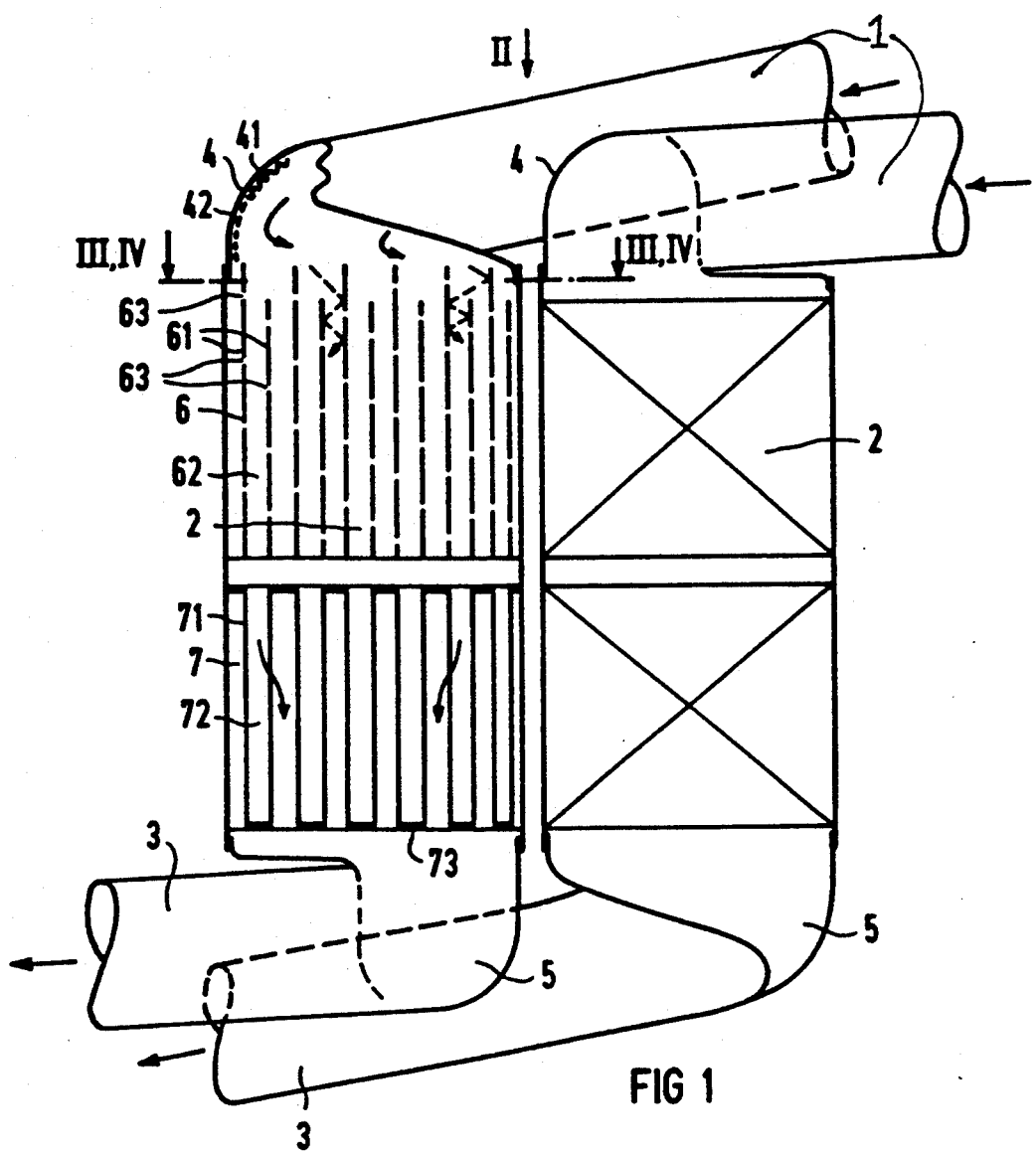
FIG. 1 is a fragmentary, diagrammatic, partly broken away, side-elevational view of an exhaust gas line as seen in the direction I of FIG. 2.
Figure 2:
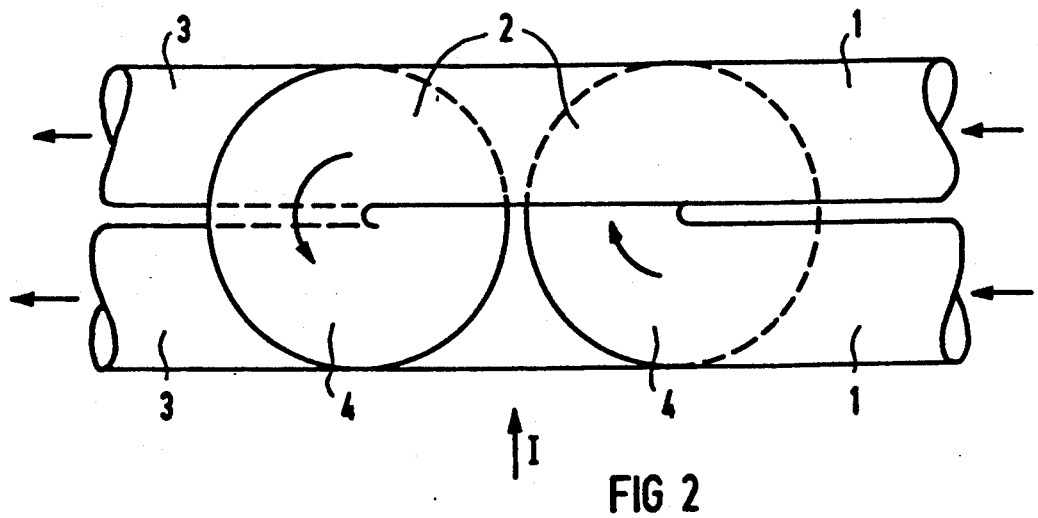
FIG. 2 is a fragmentary, top-plan view as seen in the direction II of FIG. 1.

Referring now to the figures of the drawing in detail and first, particularly, to FIGS. 1 and 2 thereof, there is seen a particularly space-saving configuration of a dual exhaust gas pipe or pipeline, in which each exhaust pipe includes a first segment 1, a second segment 2 of enlarged diameter and a third segment 3. The segments are connected with one another by suitable non-illustrated means, for instance by being screwed together, and they communicate through first adaptors 4 and second adaptors 5 disposed between them. The first segments 1 enter the first adaptors 4 eccentrically, and the third segments 3 are likewise eccentrically disposed on the second adaptors 5.

The insides of the adaptors 4, 5 themselves are constructed in such a way as to approximately match the contour of a tubular coil, tubular spiral or tubular worm, or a combination of these shapes. One skilled in the art may adapt the shape to specific existing conditions, for instance to the difference in diameter between the first and third segments 1, 3 or the first and second segments 1, 2. The shape of the adaptors 4, 5 will be similarly affected if the deflection between the various segments, as shown at the upper left and lower right in FIG. 1, is not precisely a right angle. It is particularly advantageous if the diameter of the first and third segments 1, 3 is approximately one-half to three-fourths the diameter of the second segment 2. The eccentricity of the first segment to the last segment should be dimensioned in such a way that all of the eccentricity comes to rest on only one side of the longitudinal axis. If applicable, the non-illustrated oversize of the adaptors 4, 5 which is then necessary, should be reduced back down to the diameter of the second segment 2 in some streamlined manner. The important factor is that the exhaust gas flow is forced by the first adaptor 4 to pursue a helical and/or spiral motion in the direction of the end surface of the honeycomb body located downstream.

Catalyst carrier bodies 6 and/or Diesel soot filters 7 are disposed as elements inside the second segments 2. In most cases, it is sufficient to provide an element of only one of these two types. A converse configuration is also possible. In other words, it is possible for a Diesel soot filter 7 to be upstream of a catalyst carrier body 6. The honeycomb body may be formed of some type of ceramic. However, in the present case, it has been assumed that it is a catalyst carrier body that includes individual structured layers of sheet metal, preferably layers that are alternatingly smooth and corrugated, which extend from the inside outward approximately in a circle or in an evolute pattern. They are provided with a coating that converts the carbon monoxide entrained in the exhaust gas into carbon dioxide and converts nitrogen oxide into nitrogen and oxygen. In order to shift the onset of laminar flow as far as possible into channels 62 formed by sheets or sheet-metal layers 61, with these channels being relatively long as compared to their cross section, individual sheets 61 (in this case, every other one) protrude on the front past the other sheets. This leads to better turbulence of the exhaust gas flow in combination with the helical flow (represented by arrows) generated by the first adaptor. The oblique oncoming flow to the sheets furthermore results in sound waves (represented by dashed lines) originating in a non-illustrated internal combustion engine being reflected many times at the sheets, so that a considerable reduction in the noise level is already achieved thereby. As a result, non-illustrated mufflers disposed further on in the course of the exhaust gas pipe can be simplified, so that the pressure loss that they cause is reduced as well. In this way, the additional pressure loss caused by the deflection of the gas flow and in particular by the oblique flow arriving at the sheets 61 is compensated for.

A further increase in this noise abatement can be obtained by providing the inside of the first adaptor 4 with a surface structure that acts to disperse sound. The illustrated embodiment shows knobs 41 and a perforated double plate 42 spaced apart from the wall. Naturally, identical means may be provided in the second adaptor 5 as well.

At least some of the sheets 61 are provided with openings 63, through which sound waves traveling in a given one of the channels 62 can be superimposed on those traveling in adjacent channels, preferably in such a way that they cancel each other out. The most suitable configuration of the openings 63 in terms of their size, number, mutual spacing, and so forth can be ascertained by experimentation. The Diesel soot filter 7 disposed in the second segment 2 preferably includes a ceramic honeycomb body in which webs or ribs 71 form channels 72 therebetween. The individual channels 72 are closed with plugs 73 that are alternatingly disposed on upstream and downstream ends of the channels, so that the exhaust gas is forced to make its way through the porous webs 71. Entrained soot particles are caught as a result.

Figure 3:
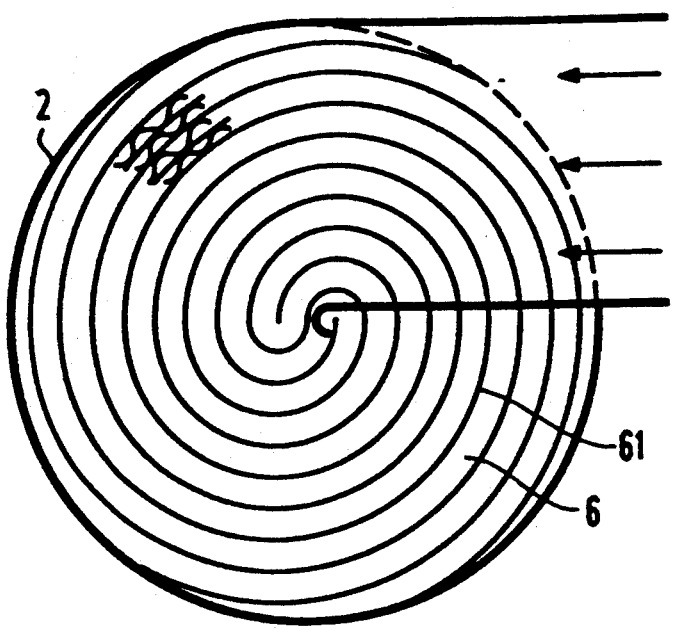
FIGS. 3 and 4 are cross-sectional views of two alternative embodiments, respectively taken along the lines III—III and IV—IV of FIG. 1.
Figure 4:
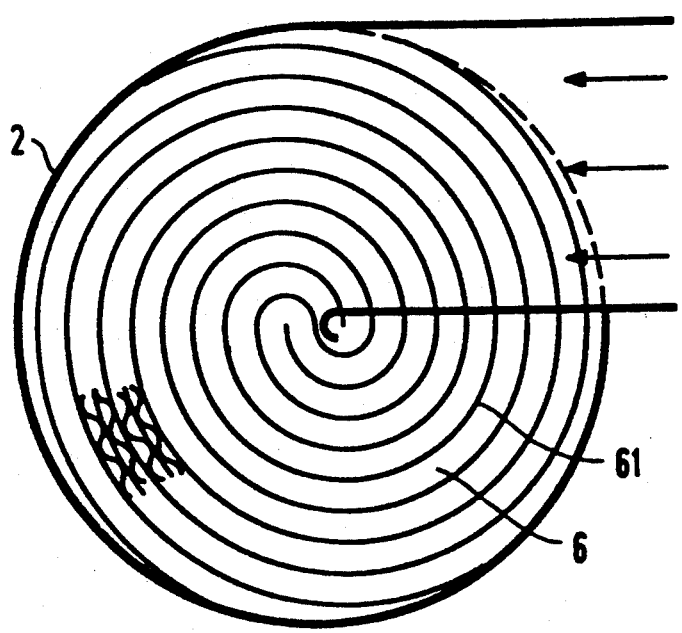

As shown in FIGS. 3 and 4, the direction of rotation of the curved or evolute-shaped, alternatingly smooth and corrugated sheets 61 may be selected differently, assuming the same oncoming flow direction on the part of the exhaust gas which is represented by arrows. In the embodiment shown in FIG. 3, a predominantly transverse flow meets the sheets 61. The result is an increased noise-reducing effect, since the sound waves are reflected to an increased extent between the sheets 61. By comparison, the sheets in a configuration shown in FIG. 4 experience an oncoming flow predominantly in the direction of their curvature, so that their flow resistance is minimized. It can also be seen that in a configuration in accordance with FIG. 3, the exhaust gas flow is preferentially directed into the center while in contrast, in a configuration according to FIG. 4, it is primarily directed into the peripheral zones. This effect of the different direction of rotation may be important in terms of the desired effect of making the oncoming flow uniform over the cross section.

I claim:

1. Exhaust gas pipe, comprising a plurality of segments forming at least one angular bend, said segments including a first segment having a given diameter, an adaptor communicating with said first segment, a second segment communicating with said adaptor and having a diameter larger than said given diameter, and a honeycomb body being disposed directly downstream of said adaptor and having a side with an end surface facing towards an exhaust gas flow, said adaptor having a shape forcing exhaust gas to approach said end surface in a curved path having a curvature and pitch reducing contact between exhaust gas having already been deflected and exhaust gas newly flowing into said adaptor.

2. Exhaust gas pipe according to claim 1, wherein said at least one angular bend includes a bend of approximately 90°.

3. Exhaust gas pipe according to claim 1, wherein said curved path is helical.

4. Exhaust gas pipe according to claim 1, wherein said curved path is spiral.

5. Exhaust gas pipe according to claim 1, wherein said curved path is helical and spiral.

6. Exhaust gas pipe according to claim 1, wherein said curvature and pitch prevent contact between the exhaust gas having already been deflected and the exhaust gas newly flowing into said first adaptor.

7. Exhaust gas pipe, comprising a plurality of segments forming at least one angular bend, said segments including a first segment having a given cross section, an adaptor communicating with said first segment, a second segment communicating with said adaptor and having a cross section larger than said given cross section, and a honeycomb body being disposed directly downstream of said adaptor and having a side with an end surface facing towards an exhaust gas flow, said adaptor having an inside with approximately the shape of a curved tubing segment approaching said end surface and being cut open in direction toward said end surface.

8. Exhaust gas pipe according to claim 1, wherein said at least one angular bend includes a bend of approximately 90°.

9. Exhaust gas pipe according to claim 1, wherein said curved tubing segment is a coiled tubing segment.

10. Exhaust gas pipe according to claim 1, wherein said curved tubing segment is a spiral tubing segment.

11. Exhaust gas pipe according to claim 1, wherein said curved tubing segment is a coiled and spiral tubing segment.

12. Exhaust gas pipe according to claim 1, wherein said given diameter of said first segment is approximately one-half to three-fourths of the diameter of said second segment.

13. Exhaust gas pipe according to claim 2, wherein said given cross section of said first segment is approximately one-half to three-fourths of the cross section of said second segment.

14. Exhaust gas pipe according to claim 12, wherein said adaptor has approximately the shape of tubular coils resting tightly against each other, and carries the exhaust gas completely to said end surface in at most approximately one revolution of the tubular coils.

15. Exhaust gas pipe according to claim 13, wherein said adaptor has approximately the shape of tubular coils resting tightly against each other, and carries the exhaust gas completely to said end surface in at most approximately one revolution of the tubular coils.

16. Exhaust gas pipe according to claim 1, wherein said shape of said adaptor forces the exhaust gas flow to take a path in which it meets said end surface at an angle of substantially between 30° and 60°.

17. Exhaust gas pipe according to claim 1, wherein said first segment discharges approximately at a tangent into said adaptor.

18. Exhaust gas pipe according to claim 2, wherein said first segment discharges approximately at a tangent into said adaptor.

19. Exhaust gas pipe according to claim 1, wherein said adaptor is a first adaptor, and including a third segment, and a second adaptor similar to the first adaptor forming a transition between said second segment and said third segment.

20. Exhaust gas pipe according to claim 2, wherein said adaptor is a first adaptor, and including a third segment, and a second adaptor similar to the first adaptor forming a transition between said second segment and said third segment.

21. Exhaust gas pipe according to claim 1, wherein said honeycomb body is a catalyst carrier body for exhaust gas decontamination.

22. Exhaust gas pipe according to claim 2, wherein said honeycomb body is a catalyst carrier body for exhaust gas decontamination.

23. Exhaust gas pipe according to claim 21, wherein said catalyst carrier body includes a plurality of structured sheet-metal layers.

24. Exhaust gas pipe according to claim 22, wherein said catalyst carrier body includes a plurality of structured sheet-metal layers.

25. Exhaust gas pipe according to claim 23, wherein some of said layers at said end surface protrude beyond others of said layers.

26. Exhaust gas pipe according to claim 24, wherein some of said layers at said end surface protrude beyond others of said layers.

27. Exhaust gas pipe according to claim 23, wherein all of said layers are outwardly bent in the same given direction of curvature from the interior of said catalyst carrier body, and the exhaust gas is deflected by said adaptor in the same given direction of curvature.

28. Exhaust gas pipe according to claim 27, wherein all of said layers are circularly bent.

29. Exhaust gas pipe according to claim 27, wherein all of said layers are involutely bent.

30. Exhaust gas pipe according to claim 24, wherein all of said layers are outwardly bent in the same given direction of curvature from the interior of said catalyst carrier body, and the exhaust gas is deflected by said adaptor in the same given direction of curvature.

31. Exhaust gas pipe according to claim 30, wherein all of said layers are circularly bent.

32. Exhaust gas pipe according to claim 30, wherein all of said layers are involutely bent.

33. Exhaust gas pipe according to claim 23, wherein all of said layers are outwardly bent in the same given direction of curvature from the interior of said catalyst carrier body, and the exhaust gas is deflected by said adaptor in a direction of curvature opposite to said given direction.

34. Exhaust gas pipe according to claim 33, wherein all of said layers are circularly bent.

35. Exhaust gas pipe according to claim 33, wherein all of said layers are involutely bent.

36. Exhaust gas pipe according to claim 24, wherein all of said layers are outwardly bent in the same given direction of curvature from the interior of said catalyst carrier body, and the exhaust gas is deflected by said adaptor in a direction of curvature opposite to said given direction.

37. Exhaust gas pipe according to claim 36, wherein all of said layers are circularly bent.

38. Exhaust gas pipe according to claim 36, wherein all of said layers are involutely bent.

39. Exhaust gas pipe according to claim 23, wherein said layers define channels therebetween, and at least some of said layers have openings formed therein through which adjacent channels communicate with one another.

40. Exhaust gas pipe according to claim 24, wherein said layers define channels therebetween, and at least some of said layers have openings formed therein through which adjacent channels communicate with one another.

41. Exhaust gas pipe according to claim 1, wherein said honeycomb body is a Diesel soot filter.

42. Exhaust gas pipe according to claim 2, wherein said honeycomb body is a Diesel soot filter.

43. Exhaust gas pipe according to claim 41, wherein said Diesel soot filter is a ceramic honeycomb body having ribs, and some of said ribs protrude past others of said ribs at said end surface.

44. Exhaust gas pipe according to claim 42, wherein said Diesel soot filter is a ceramic honeycomb body having ribs, and some of said ribs protrude past others of said ribs at said end surface.

45. Exhaust gas pipe according to claim 19, wherein at least one of said adaptors has an inside with a sound-dispersing surface structure.

46. Exhaust gas pipe according to claim 20, wherein said second adaptor also has an inside, and said inside of at least one of said adaptors has a sound-dispersing surface structure.

* * * * *

UNITED STATES PATENT AND TRADEMARK OFFICE
CERTIFICATE OF CORRECTION

PATENT NO.  : 5,144,797

DATED       : September 8, 1992

INVENTOR(S) : HELMUT SWARS

It is certified that error appears in the above-identified patent and that said Letters Patent is hereby corrected as shown below:

ON THE TITLE PAGE:

Add Item -- (30) Foreign Application Priority Data
               Dec. 22, 1989 (EP) Euorpean Patent Office
                              89123787.7--.

Signed and Sealed this

Twenty-first Day of September, 1993

Attest:

BRUCE LEHMAN

*Attesting Officer*       *Commissioner of Patents and Trademarks*